US010535090B2

(12) United States Patent
Thompson et al.

(10) Patent No.: US 10,535,090 B2
(45) Date of Patent: Jan. 14, 2020

(54) MODIFYING COMMUNICATION OF ORDERS TO VENDORS WITHIN A VENUE

(71) Applicant: VenueNext, Inc., Santa Clara, CA (US)

(72) Inventors: Matt Thompson, Santa Clara, CA (US); John M. Paul, Palo Alto, CA (US)

(73) Assignee: VenueNext, Inc., Santa Clara, CA (US)

( * ) Notice: Subject to any disclaimer, the term of this patent is extended or adjusted under 35 U.S.C. 154(b) by 531 days.

(21) Appl. No.: 15/294,632

(22) Filed: Oct. 14, 2016

(65) Prior Publication Data

US 2018/0108070 A1 Apr. 19, 2018

(51) Int. Cl.
*G06Q 30/06* (2012.01)

(52) U.S. Cl.
CPC ..... *G06Q 30/0633* (2013.01); *G06Q 2240/00* (2013.01)

(58) Field of Classification Search
CPC .................................................. G06Q 30/0633
USPC ........................................................ 705/26.8
See application file for complete search history.

(56) References Cited

U.S. PATENT DOCUMENTS

| 8,615,441 | B1* | 12/2013 | Fuss ....................... | G06Q 30/00 |
| | | | | 705/26.1 |
| 9,807,186 | B1* | 10/2017 | Paul ........................ | H04L 67/26 |
| 2008/0222004 | A1* | 9/2008 | Pollock ............... | G06O 30/0603 |
| | | | | 705/15 |
| 2009/0228325 | A1* | 9/2009 | Simmons ......... | G06Q 10/06313 |
| | | | | 705/7.23 |
| 2010/0121688 | A1* | 5/2010 | Marsch .............. | G06Q 10/0639 |
| | | | | 705/7.38 |
| 2011/0173041 | A1* | 7/2011 | Breitenbach ..... | G06Q 10/06311 |
| | | | | 705/7.13 |
| 2016/0189279 | A1* | 6/2016 | York ..................... | G06F 16/904 |
| | | | | 705/26.81 |
| 2016/0189280 | A1* | 6/2016 | York .................. | G06Q 30/0635 |
| | | | | 705/26.81 |
| 2016/0189436 | A1* | 6/2016 | York ..................... | G07B 15/02 |
| | | | | 705/13 |

* cited by examiner

*Primary Examiner* — Alexis M Casey
(74) *Attorney, Agent, or Firm* — Fenwick & West LLP

(57) ABSTRACT

To improve user interaction with a venue, a venue management system is associated with the venue and maintains information associated with users and with vendors associated with the venue. The venue management system receives orders for products or services from users and communicates the received orders to vendors associated with the venue to be fulfilled. The venue management system dynamically modifies communication of orders to various vendors associated with the venue for fulfillment to expedite order fulfillment. To modify communication of orders to vendors, the venue management system accounts for times for different vendors to fulfill orders, delivery times from vendors to users, resources used to fulfill orders by various vendors, and distances between various vendors and users placing orders.

14 Claims, 3 Drawing Sheets

MODIFYING COMMUNICATION OF ORDERS TO VENDORS WITHIN A VENUE

BACKGROUND

This invention relates generally to facilitating user interaction with a venue, and more specifically to managing communication of orders to vendors associated with the venue.

Venues such as stadiums, convention centers, or amphitheaters frequently host events that large numbers of users attend. These users compensate the venue in exchange for attending the venue during an event, providing revenue to the venue. Many venues also obtain additional revenue from vendors associated with the venue that provide goods or services to users attending the venue or from selling parking spaces in one or more parking lots associated with the venue to users who are attending the venue.

However, if a large number of users attend a venue, congestion may impair many users' experience at the venue. For example, delays in placing orders with vendors or delays in vendors fulfilling received orders may discourage users from purchasing goods or services from vendors associated with the venue, decreasing revenue to the vendor, which decreases revenue to the venue. Additionally, vendors receiving a larger number of orders than they can successfully fulfill in a reasonable time frame often results in the vendors losing user loyalty because of delays or incorrectly fulfilled orders, which may prevent additional users from ordering goods or services from the vendors or may prevent additional orders for goods or services from users. Lack of satisfaction in vendors fulfilling orders may prevent users from subsequently attending the venue.

SUMMARY

A venue is a geographic location, such as a geographic location associated with one or more structures. Examples of a venue include a stadium, a convention center, an arena, a theater, an amphitheater, or other suitable structure or location where people may gather for an event. In various embodiments, users obtain a ticket to enter the venue, and various events are performed at the venue. Additionally, one or more vendors are associated with the venue and provide goods or services to users attending the venue. One or more parking lots, each including spaces for one or more vehicles, are also associated with the venue to allow users to more easily attend the venue.

To improve user interaction with the venue, a venue management system is associated with the venue and maintains information associated with users and with vendors associated with the venue. The venue management system communicates information about the venue or about events occurring at the venue to client devices associated with users of the venue management system. Additionally, the venue management system receives orders for products or services from users and communicates the received orders to vendors associated with the venue to be fulfilled.

When the venue management system receives an order from a user that identifies a product or service, the venue management system determines a vendor providing the product or service to fulfill the order and communicates the order to the determined vendor. The vendor subsequently delivers the product or service identified by the order to the user, communicates a notification to the user via the venue management system when the order is fulfilled, or provides other suitable information to the user. To expedite delivery of products or services, the venue management system obtains times for various vendors to fulfill orders for products or services and determines a vendor to which a received order is communicated based on times for different vendors to fulfill orders. The venue management system may also account for locations within the venue of various vendors, as well as times for the vendors to fulfill orders for products or services, when determining a vendor to receive an order.

The length of time for a vendor to fulfill received orders may be based on various criteria. As used herein, the length of time for a vendor to fulfill a received order refers to a time from a user ordering a product or a service to the user receiving the ordered product or service from the vendor. For example, the length of time for the vendor to fulfill received orders is based on amounts of time for the vendor to retrieve or to create products (or services) identified by received orders and an amount of time for the vendor to deliver products (or services) identified by received orders to users who placed the orders after retrieving or creating the products (or services). Additionally, the length of time for the vendor to fulfill received orders may identify a number of pending orders with the vendor. In some embodiments, the length of time for the vendor to fulfill received orders from an average amount of time for the vendor to deliver products or services to users who ordered the products or services and the number of pending orders with the vendor. For example, the length of time for the vendor to fulfill received orders is a product of the average amount of time for the vendor to deliver products or services to users who ordered the products or services and the number of pending orders with the vendor.

Various vendors may use delivery personnel to deliver products or services to users who ordered the products or services from different locations within the venue, allowing users in the venue to more conveniently obtain products or services from the vendor by allowing the users to obtain the products or services without physically going to the location in the venue of the vendor. In various embodiments, the vendor maintains information for an amount of usage of delivery personnel by the vendor to deliver products or services to an amount of usage of delivery personnel by the vendor is an amount of time spent by delivery personnel delivering products or services from the vendor to users within a specific time interval. For example, the vendor associates a different identifier with different delivery personnel and captures information identifying an amount of time individual delivery personnel spent delivering products or services from the vendor to users within a time interval (e.g., an hour interval) and maintains a percentage of the time interval spent by individual delivery personnel delivering products or services from the vendor. Based on the percentages of the time interval spent by various delivery personnel delivering products or services, the vendor determines an average percentage of the time interval during which delivery personnel delivered products or services to users. As another example, the vendor maintains times for different delivery personnel to deliver products or services to users who ordered the products or services and maintains an average amount of time for delivery personnel to deliver products or services to users from the maintained times.

An amount of usage of delivery personnel by a vendor affects the length of time for the vendor to fulfill received orders in various embodiments. For example, an amount of usage of delivery personnel less than a threshold amount decreases the length of time for the vendor to fulfill received orders to indicate an increased capability of the vendor to fulfill orders; conversely, an amount of usage of delivery personnel greeter than the threshold amount increases the length of time for the vendor to fulfill received orders to indicate a reduced capability of the vendor to fulfill orders. In another example, the length of time for the vendor to fulfill received orders is directly related to the amount of usage of delivery personnel by the vendor; for example, the length of time for the vendor to fulfill received orders increases as the amount of usage by delivery personnel by the vendor increases, while the length of time for the vendor to fulfill received orders decreases as the amount of usage by delivery personnel by the vendor decreases.

The length of time for a vendor to fulfill received orders may be determined by a cost function based on multiple criteria. For example, the cost function associates different weights with different criteria and combines the weighted criteria to determine a length of time for a vendor to fulfill received orders. As an example, the cost function associates weights with an amount of usage of delivery personnel by the vendor, an average amount of time for the vendor to deliver products or services to users who ordered the products or services, and a number of orders pending by the vendor.

When the venue management system receives an order for a product or service from a user, the venue management system determines whether to communicate the order to a vendor or to an additional vendor providing the product or service for fulfillment. This expedites receipt of the product or service by the user, and allows the venue management system to allocate orders across multiple vendors to optimize fulfillment of orders by vendors by balancing fulfillment of received orders across multiple vendors. To determine a vendor that fulfills a received order, the venue management system compares lengths of times for different vendors to fulfill received orders and locations of different vendors and communicates the order to a vendor based on the comparisons. In one embodiment, the venue management system communicates an order to a vendor having a shorter time to fulfill received orders than an additional vendor and less than a threshold distance from the additional vendor. As another example, the venue management system determines a distance between a location within the venue associated with an order and a location of a vendor within the venue as well as a distance between the location within the venue associated with the order and a location of an additional vendor within the venue. The venue management system communicates the received order to the vendor if the length of time for the vendor to fulfill received orders is less than the length of time for the additional vendor to fulfill received orders and if a difference between the location within the venue associated with the vendor and the location within the venue associated with the order and the distance between the location within the venue associated with the additional vendor and the location within the venue associated with the order is less than a threshold amount. Accounting for distances between locations within the venue of different vendors and lengths of times for the different vendors to fulfill orders allows the venue management system to prevent offsetting a decrease in the length of time for the order to be fulfilled by a vendor by traversing a larger distance to provide a product or a service in the order from the vendor to a user.

The figures depict various embodiments for purposes of illustration only. One skilled in the art will readily recognize from the following discussion that alternative embodiments of the structures and methods illustrated herein may be employed without departing from the principles of described herein.

DETAILED DESCRIPTION

Venue Overview

Figure 1:
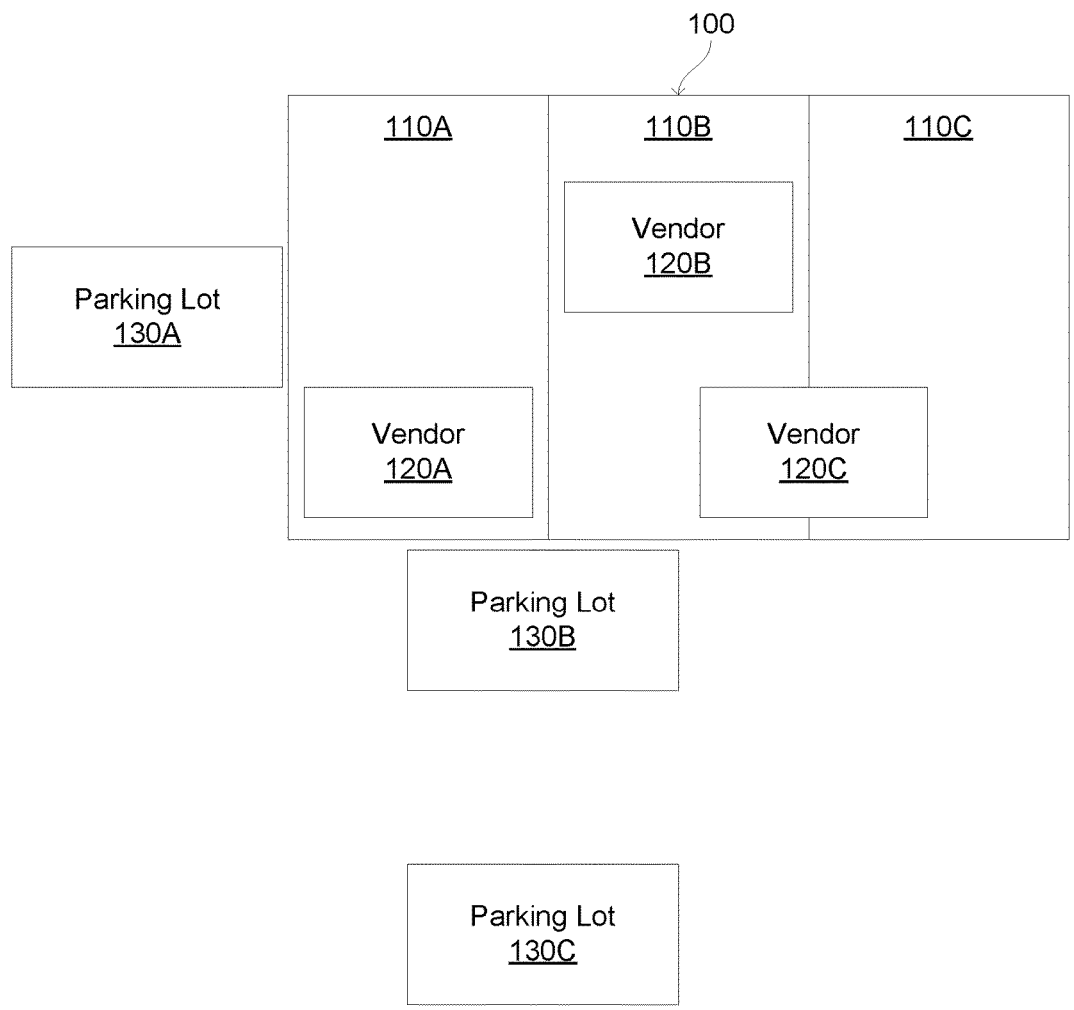
FIG. 1 is a block diagram of a venue, in accordance with an embodiment.

FIG. 1 is a block diagram of one embodiment of a venue 100. In the example of FIG. 1, the venue includes multiple regions 110A, 110B, 110C (also referred to individually and collectively using reference number 110). Additionally, one or more vendors 120A, 120B, 120C (also referred to individually and collectively using reference number 120) are included in the venue 100, and one or more parking lots 130A, 130B, 130C (also referred to individually and collectively using reference number 130) are associated with the venue 100. However, in other embodiments, different and/or additional components may be associated with or included in the venue 100.

The venue 100 is a geographic location, such as a geographic location associated with one or more structures. Examples of a venue 100 include a stadium, a convention center, an arena, a theater, an amphitheater, or other suitable structure. One or more regions 110 are included in the venue 100, with each region 110 corresponding to an area including a set of locations within the venue 100. For example, different regions 110 correspond to different sections of a stadium, different aisles of a stadium or arena, different rooms in a convention center, or any other suitable area within the venue 100. In some embodiments, an area within the venue 100 is associated with multiple regions 110 having different levels of precision. For example, a specific seat in a venue 100 is associated with a region 110 identifying a section including the seat, another region 110 identifying an aisle within the section including the seat, and an additional region identifying the specific seat. While FIG. 1 shows an example venue 100 including three regions 110A, 110B, 110C, in other embodiments, a venue 110 may include any number of regions 110.

One or more vendors 120 are included in the venue 110, with each vendor providing products or services to users within the venue 110. Examples of vendors 120 include restaurants, food service providers, beverage providers, merchandise retailers, or other suitable entities providing products or services. Different vendors 120 may be associated with different regions 110 of the venue. For example, a vendor 120A is associated with a region 110A, while a different vendor 120B is associated with a different region 110B. A vendor 110 may be associated with multiple regions 110; for example, a vendor 110C is associated with a region 110B as well as with an additional region 110C. In some embodiments, a vendor 120 is associated with a region 110 based on a distance between the vendor 120 and the region 110. For example, the vendor 120 is associated with a region 110 having a minimum distance from a location associated with the vendor 120. If a location associated with a vendor 120 is within a region 110, the vendor 120 is associated with the region 110 including the vendor's associated location.

Additionally, one or more parking lots 130A, 130B, 130C are associated with the venue 110 and identify physical locations for parking vehicles. Each parking lot includes one or more spaces, each space for parking a vehicle. A price is associated with each parking lot 130 specifying an amount of compensation a user provides to an entity associated with the venue 110 for a space in the parking lot 130 to be allocated for parking a vehicle associated with the user. Different parking lots 130 may have different distances from the venue 110, and prices associated with different parking lots 130 may be inversely proportional to a distance between a parking lot 130 and the venue 110. Each parking lot 130 is also associated with a capacity specifying a maximum number of vehicles that may be parked in a parking lot 130. The capacity may be total number of spaces in the parking lot 130 or may be a maximum number of vehicles. Information may be maintained by one or more devices included in a parking lot 130 specifying a number of spaces in the parking lot 130 in which vehicles are parked, specifying a number of vehicles within a geographic area associated with the parking lot 130, or any other suitable information. For example, a device included in the parking lot 130 increments a counter when a vehicle enters the geographic area associated with the parking lot 130 or when a vehicle is parked in a space of the parking lot 130.

System Architecture

Figure 2:
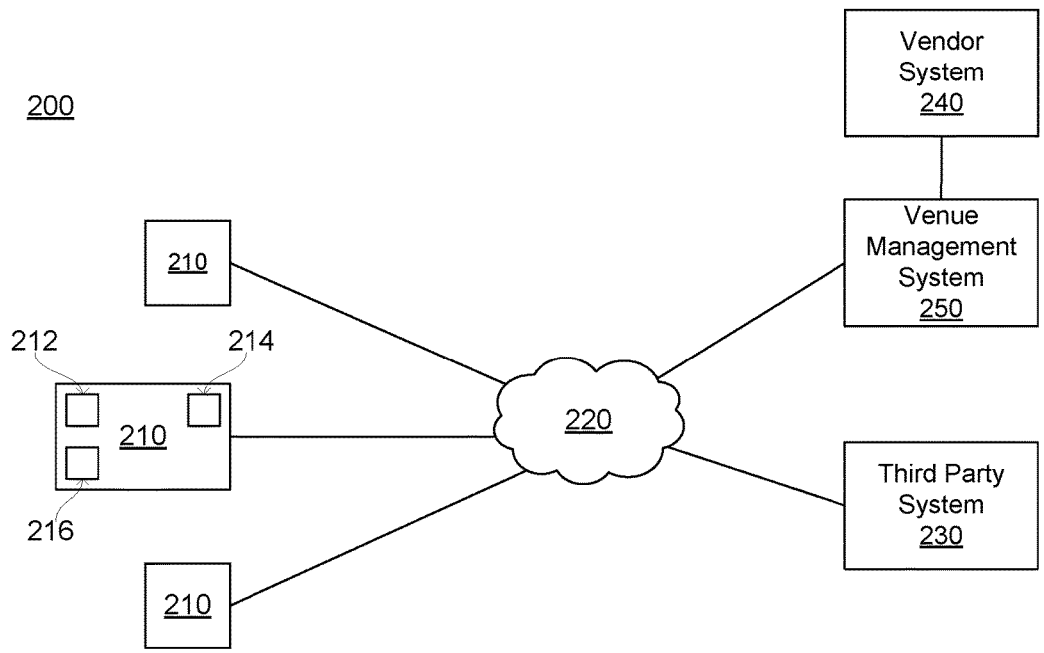
FIG. 2 is a block diagram of a system environment including a venue management system, in accordance with an embodiment.

FIG. 2 is a block diagram of a system environment 200 for a venue management system 250. The system environment 200 shown by FIG. 1 includes various client devices 210, a network 220, a third party system 230, one or more vendor systems 240, and a venue management system 250. In alternative configurations, different and/or additional components may be included in the system environment 200. The embodiments described herein may be adapted to online systems other than venue management systems.

A client device 210 is one or more computing devices capable of receiving user input as well as transmitting and/or receiving data via the network 220. In one embodiment, the client device 210 is a conventional computer system, such as a desktop computer or a laptop computer. Alternatively, the client device 210 may be a device having computer functionality, such as a personal digital assistant (PDA), a mobile telephone, a smartphone or another suitable device. A client device 210 is configured to communicate with other devices via the network 220. In one embodiment, the client device 210 executes an application allowing a user of the client device 210 to interact with the venue management system 250. For example, the client device 210 executes a browser application to enable interaction with the venue management system 250 or with one or more third party system 230 via the network 220. In another embodiment, a client device 210 interacts with the venue management system 250 through an application programming interface (API) running on a native operating system of the client device 210, such as IOS® or ANDROID™.

A display device 212 included in a client device 210 presents content items to a user of the client device 210. Examples of the display device 212 include a liquid crystal display (LCD), an organic light emitting diode (OLED) display, an active matrix liquid crystal display (AMLCD), or any other suitable device. Different client devices 210 may have display devices 212 with different characteristics. For example, different client devices 212 have display devices 212 with different display areas, different resolutions, or differences in other characteristics.

One or more input devices 214 included in a client device 210 receive input from the user. Different input devices 214 may be included in the client device 210. For example, the client device 210 includes a touch-sensitive display for receiving input data, commands, or information from a user. Using a touch-sensitive display allows the client device 210 to combine the display device 212 and an input device 214, simplifying user interaction with presented content items. In other embodiments, the client device 210 may include a keyboard, a trackpad, a mouse, or any other device capable of receiving input from a user. Additionally, the client device may include multiple input devices 214 in some embodiments. Inputs received via the input device 214 may be processed by an application associated with the venue management system 250 and executing on the client device 210 to allow a client device user to exchange information with the venue management system 250.

Additionally, a client device 210 may include one or more position sensors 216, which determine a physical location associated with the client device 210. For example, a position sensor 216 is a global positioning system (GPS) sensor that determines a location associated with the client device 210 based on information obtained from GPS satellites communicating with the GPS sensor, such as coordinates specifying a latitude and longitude of the location associated with the client device 210. As another example, a position sensor 216 determines a location associated with the client device 210 based on intensities of signals received from one or more access points (e.g., wireless access points) by the client device 110. In the preceding example, the position sensor 216 determines a location associated with the client device 210 based on signal intensity between the client device 210 and one or more wireless access points and service set identifiers (SSIDs) or media access control (MAC) addresses of the wireless access points. However, the client device 210 may include any suitable type of position sensor 216. In various embodiments, the client device 210 may include multiple position sensors 216.

The network 220 may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 130 may be coupled to the network 220 for communicating with one or more client devices 110 or with the venue management system 250. In one embodiment, a third party system 230 is an application provider communicating information describing applications for execution by a client device 210 or communicating data to client devices 110 for use by an application executing on the client device 210. In other embodiments, a third party system 230 provides content or other information for presentation via a client device 210. For example, a third party system 230 provides content related to an event occurring at the venue 110 to a client device 210 for presentation to a user; as an example, the third party system 230 provides video or audio data of a portion of an event occurring at the venue to a client device 210, allowing a user associated with the client device 210 to view the portion of the event from an alternative vantage point than the user's vantage point or to hear commentary about the portion of the event. As another example, a third party system 230 is a social networking system maintaining connections between various users and providing content for presentation to users based at least in part on the maintained connections. A third party system 230 may also communicate information to the venue management system 250, which subsequently communicates the information, or a portion of the information, to one or more client devices 110 via the network 220.

Additionally, one or more vendor systems 240 are coupled to the venue management system 250 via the network 220 or through direct connections between the vendor systems 240 and the venue management system 250. A vendor system 240 is associated with a vendor 120 and receives orders for products or services from the venue management system 250 and provides the products or services identified by the orders. Further, a vendor system 240 provides the venue management system 250 with information describing fulfillment of orders by a vendor 120 associated with the vendor system 240. For example, the vendor system 240 provides information to the venue management system 250 specifying an estimated time to fulfill subsequently received or pending orders for products or services, an average time in which previously received orders were fulfilled, a number of unfulfilled orders received by the vendor system 240, or other suitable information. Information provided from the vendor system 240 to the vendor management system 250 accounts for orders received via the venue management system 250 as well as orders received by the vendor 120 associated with the vendor system 240 from users visiting a location associated with the vendor 120.

Additionally, a vendor system 240 may provide information to the venue management system 250 describing products or services sold by a vendor 120 associated with the vendor system 240. For example, the vendor system 240 identifies a number of different products or services 140 sold by the vendor 120 or identifies an amount of revenue received by the vendor 120 in exchange for different products or services. Information describing sold products or services may be communicated from the vendor system 240 to the venue management system 250 as the products or services are sold or may be communicated from the vendor system to the venue management system 250 at periodic intervals. Additionally, the venue management system 250 may request information describing sales of products or services to a vendor system 240, which provides the requested information to the venue management system 250 in response to receiving the request.

The venue management system 250, which is further described below in conjunction with FIG. 3, receives content from one or more third party systems 230 or generates content and provides content to users via an application associated with the venue management system 250 and executing on client devices 210. Additionally, the venue management system 250 maintains information associated with one or more parking lots 130 associated with a venue 100, such as a number of spaces in a parking lot 130 currently occupied, a price associated with a the parking lot 130, or a number of spaces in the parking lot 130 that have been purchased, as well as directions for navigating to a location associated with the parking lot 130. The venue management system 250 may communicate certain information associated with a parking lot 130 to one or more users, such as the price associated with the parking lot 130 or directions to the location associated with the parking lot 130. Associations between one or more vendors 120 and regions 110 of the venue 100 are also included in the venue management system 250, which also receives orders for products or services from one or more users and communicates the orders to one or more vendors 120 for fulfillment.

Figure 3:
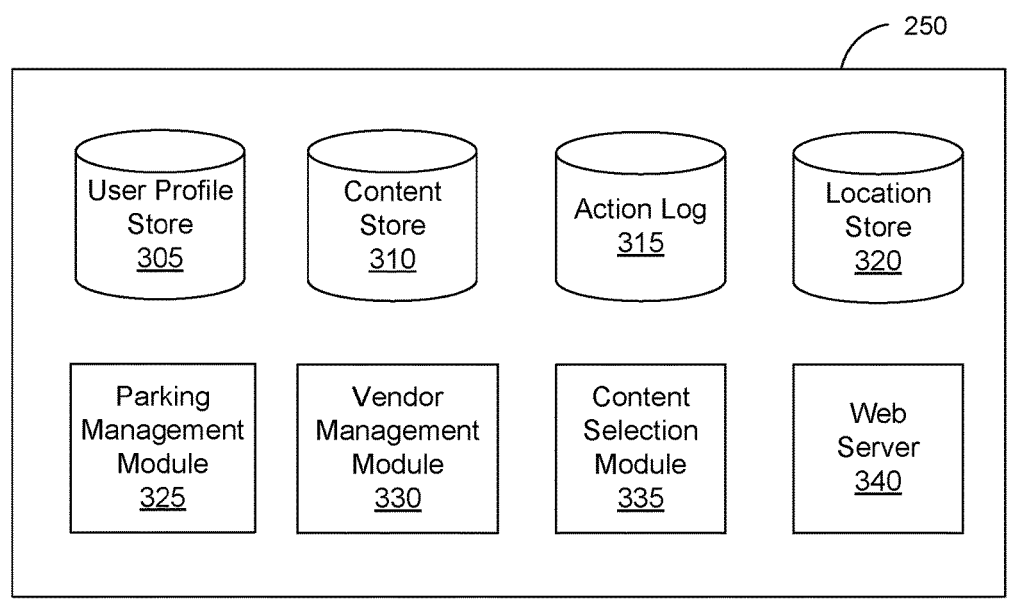
FIG. 3 is a block diagram of a venue management system, in accordance with an embodiment.

FIG. 3 is a block diagram of an architecture of a venue management system 250. The venue management system 250 shown in FIG. 3 includes a user profile store 305, a content store 310, an action log 315, a location store 320, a parking management module 325, a vendor management module 330, a content selection module 335, and a web server 340. In other embodiments, the venue management system 250 may include additional, fewer, or different components for various applications. Conventional components such as network interfaces, security functions, load balancers, failover servers, management and network operations consoles, and the like are not shown so as to not obscure the details of the system architecture.

Each user of the venue management system 250 is associated with a user profile, which is stored in the user profile store 305. A user profile includes declarative information about the user provided by the user and may also include information inferred by the venue management system 250 from actions associated with the user or from other information. In one embodiment, a user profile includes multiple data fields, each describing one or more attributes of the corresponding user. Examples of information stored in a user profile include demographic information, contact information, preferences, and location information. For example, a user profile identifies a region 110 of the venue 100 associated with a user, such as a region 110 including a seat associated with a ticket to attend the venue 100 associated with the user. A user profile may also store other information provided by the user, for example, image data or video data. Additionally, a user profile in the user profile store 205 may also maintain references to actions by the corresponding user performed on content presented by the venue management system 250 or interactions between the corresponding user captured by one or more vendor systems 240 and communicated to the venue management system 250. For example, a user profile identifies prior orders for products or services the venue management system 250 received from a user and communicated to one or more vendor systems 150.

In some embodiments, a user profile includes a status associated with the user. The venue management system 250 may provide different functionality to a user based on the user's status. For example, the venue management system 250 communicates certain types of messages to client devices 210 associated with users having a specific type of status and does not communicate the certain types of messages to client devices 210 associated with users that do not have the specific type of status. As another example, the venue management system 250 presents less advertisement content to users having specific statuses. The status may be based on a frequency with which the user is associated with tickets to attend the venue 100 or an amount of money the venue management system 250 has received from the user (e.g., based on an amount the user has spent on tickets to attend the venue 100). Additionally, a user may provide an amount of compensation to the venue management system 250 for a specific status to be associated with the user. For example, the user provides the venue management system 250 with an amount of compensation per year or per month for the venue management system 250 to associate a specific status with the user.

The content store 310 stores objects that each represents various types of content received from one or more third party systems 230 or generated by the venue management system 250. Examples of content represented by an object include video data associated with an event occurring at the venue 100, image data associated with an event occurring at the venue 100, audio data associated with an event occurring at the venue 100, text data associated with an event occurring at the venue 100, information associated with the venue 100 or with the location of the venue 100, or other suitable. Additionally, content may be received from applications associated with a third party system 230 and executing on client devices 210 associated with users of the venue management system 230. In one embodiment, objects in the content store 210 represent single pieces of content, or content "items."

The action log 315 stores information describing actions performed by venue management system users internal to or external to the venue management system 250. For example, actions performed by a user on a third party system 230 that communicates information to the venue management system 250 are stored in the action log 315 along with information describing actions performed by the user through the venue management system 250. Examples of actions include: ordering a product or service from a vendor 120 included in the venue 100, checking-into the venue, accessing content provided by the venue management system 250 or provided by a third party system 230 that communicates with the venue management system 250, providing a review of a product, service, or vendor 120 to the venue management system 250 or to a third party system 230 that communicates with the venue management system 250, providing a comment associated with the venue 100 or with an event occurring at the venue 100 to the venue management system 250 or to a third party system 230 that communicates with the venue management system 250. However, any suitable action may be stored in the action log 315 and associated with a user profile in the user profile store 305. Information in the action log 315 may identify the user performing an action, a type of the action, a description of the action, a time associated with the action, or any other suitable information. In some embodiments, data from the action log 315 is used to infer interests or preferences of a user, augmenting interests included in the user's user profile and allowing a more complete understanding of user preferences.

The action log 315 may also store user actions taken on a third party system 230, such as an external website, and communicated to the venue management system 250. For example, an e-commerce website may recognize a user of the venue management system 250 through a plug-in enabling the e-commerce website to identify the venue management system user. Because users of the venue management system 250 are uniquely identifiable, third party systems 230 may communicate information about a user's actions outside of the venue management system 250 to the venue management system 250 for association with the user. Hence, the action log 315 may record information about actions users perform on a third party system 230, such as purchases made, comments on content, or other information a user authorizes a third party system 230 to communicate to the venue management system 250.

The location store 320 includes physical locations associated with various regions 110 of the venue 100. In various embodiments, the location store 320 includes a region identifier associated with each region 110 and information identifying a geographic area associated with the region identifier. Any suitable information may identify the geographic area associated with a region identifier. Example information identifying a geographic area of a region 110 include: physical coordinates specifying boundaries of a region 110 and an identifier of a portion of the venue 100 including the region 110. Additionally, the location store 320 includes data associating vendors 120 with one or more regions 110 of the venue 100. A vendor identifier uniquely associated with a vendor 120 is associated with a region identifier, with the association stored in the location store 320. Multiple vendors 120 may be associated with a region 110 of the venue 100.

In some embodiments, the location store 320 also associates location information with users of the venue management system 250. A client device 210 communicates location information to the venue management system 250, which may store the location information in the location store 320 or in the user profile store 305 in association with the user. Based on the received information, the venue management system 250 may determine a region 110 of the venue including the location information and associate the region identifier of the determined region with a user profile corresponding to the user. If the venue management system 250 receives modified location information from the client device 210, the venue management system 205 may modify the determined region 110 if a different region includes the modified location information. Alternatively, one or more sensors included in the venue 100 identify a client device 210 and determine a location associated with the client device 210. Based on the determined location, the venue management system 250 identifies a region 110 including the client device 110 and stores a region identifier of the region 110 in association with a user identifier of a user associated with the client device 210. In various embodiments, information identifying a location associated with the client device 210 (e.g., latitude and longitude) is also stored in the location store 320 in association with an identifier associated with the user associated with the client device 210. Additionally, the venue management system 250 may assign a location to a user and store the assigned location in association with the user in the location store 320. For example, when a user purchases a ticket to enter the venue 100, the ticket is associated with a location assigned to the user, and the location store 320 includes information associating the location assigned to the user from the ticket with an identifier associated with the user.

The parking management module 325 includes information identifying parking lots 130 associated with the venue and describing various parking lots 130. Each parking lot 130 is associated with a lot identifier that uniquely identifies a parking lot 130. Characteristics of a parking lot 130 are stored in the parking management module 325 in association with a lot identifier corresponding to the parking lot 130. Characteristics of a parking lot 130 include a capacity for the parking lot 130 that specifies a maximum number of vehicles capable of being parked in the parking lot 130 and a price associated with the parking lot 130 for allocating a space in the parking lot 130 to a vehicle. Additional characteristics of a parking lot 130 include one or more locations associated with the parking lot 130 (e.g., entrances) and directions to the location associated with the parking lot 130. Directions from one or more locations associated with the parking lot 130 to the venue 100 may also be maintained by the parking management module 325.

Certain characteristics of a parking lot 130 are modified based on information is received by the venue management system 250. As users purchase spaces in a parking lot 130, the parking management module 325 maintains a number of purchased spaces associated with the parking lot 130. Additionally, when a vehicle enters a parking lot 130, information is communicated from the parking lot to the venue management system 250, where the parking management module 325 maintains a number of vehicles currently occupying the parking lot 130 or a number of currently occupied spaces in the parking lot 130. In some embodiments, a ticket is scanned or other information is captured by a device (e.g., scanner, card reader, terminal) when a vehicle enters the parking lot 130; the device communicates an indication that information was captured to the venue management system 250, causing the parking management module 325 to increment a number of spaces in the parking lot 130 currently associated with vehicles or to increment a number of currently occupied spaces in the parking lot 130. Thus, the parking management module 325 maintains a number of spaces in a parking lot 130 that are currently occupied by vehicles and modifies the number of currently occupied spaces as vehicles are parked in the parking lot.

Based on a number of spaces currently associated with vehicles in various parking lots 130, the parking management module 325 may communicate messages to client devices 210 identifying one or more of the parking lots 130. In one embodiment, the parking management module 325 selects a parking lot 130 based on a difference between a number of previously purchased spaces in the parking lot 130 and a number of currently occupied spaces in the parking lot 130. For example, the parking management module 325 selects a parking lot 130 having at least a threshold difference between a number of previously purchased spaces and a number of currently occupied spaces, which indicates there are at least the threshold number of unoccupied spaces in the selected parking lot 130. To increase the number of vehicles in the selected parking lot 130, the parking management module 325, the parking management module communicates a message to client devices 110 associated with one or more users identifying the selected parking lot. The message may indicate a number of unoccupied spaces in the selected parking lot 130 as well as the price associated with the selected parking lot 130. In some embodiments, the parking management module 325 modifies the price associated with the selected parking lot 130 to encourage users to park vehicles in spaces of the selected parking lot. The parking management module 235 may also modify a price associated with the selected parking lot 130 to encourage users to park vehicles in spaces of the selected parking lot 130. For example, the parking management module 325 decreases a price of the selected parking lot 130 to increase likelihoods of users purchasing spaces in the selected parking lot 130.

The parking management module 325 also receives information describing traffic conditions within a threshold distance of the parking lot 130 associated with the user and determines the directions for communication to the user based at least in part on the traffic conditions. Information describing the traffic conditions includes a number of currently occupied spaces in one or more additional parking lots 130, such as additional parking lots 130 within a threshold distance of the parking lot 130 associated with the user. Based on the information describing the traffic conditions, the parking management module 325 may modify the directions to one or more locations associated with the parking lot associated with the user. For example, the parking management module 325 modifies the directions to a location associated with the parking lot 130 to avoid one or more additional parking lots 130 with at least a threshold number of currently occupied spaces or to avoid one or more geographic regions having at least a threshold number or density of vehicles. As traffic conditions change, the parking management module 325 may further modify the direction to a location associated with the parking lot 130 and communicate the further modified directions to the client device 210 associated with the user, allowing a user to bypass congestion when travelling to the parking lot 130 associated with the user.

The vendor management module 330 receives orders for products or services from client devices 210 associated with users and communicates the orders to one or more vendor systems 240 of vendors 120 associated with the venue 100. In various embodiments, the vendor management module 330 includes vendor profiles each associated with one or more vendors 120 associated with the venue 100. A vendor profile includes a vendor identifier uniquely identifying a vendor 120 and additional information associated with the vendor 120, such as one or more regions 110 of the venue 100 associated with the vendor 120 and information for communicating with a vendor system 240 associated with the vendor 120. Further examples of information associated with the vendor 120 and included in a vendor profile include: contact information, hours of operation, a listing of products or services provided by the vendor 120, a current inventory or products maintained by the vendor 120, and a current time for the vendor 120 to fulfill received orders. However, in other embodiments, additional or different information may be included in the vendor profile. One or more users authorized by the venue management system 250 may communicate information to the vendor management module 330 to modify regions 110 of the venue 100 associated with one or more vendors 120.

When the vendor management module 330 receives an order identifying a product or service and identifying a vendor 120 from a user, the vendor management system 330 communicates the order to a vendor system 240 corresponding to the identified vendor 120. The vendor 120 may subsequently deliver the product or service identified by the order to the user or may communicate a notification to the user via the venue management system 250 when the order is fulfilled. To expedite delivery of products or services, the vendor management module 330 may associate different vendors 120 with different regions 110 of the venue 100 to reduce time for users to receive products or services delivered by vendors 120. The vendor management module 330 may modify regions 110 of the venue 100 associated with a vendor 120 by modifying identifiers of regions 110 included in a vendor profile of a vendor 120. In some embodiments, the vendor management module 330 modifies regions 110 associated with a vendor 120 based on a number or a frequency of orders received from users associated with different regions 110 as well as a time to fulfill orders by different vendors 120, products or services offered by different vendors 120 or a number of orders received by different vendors 120. When modifying regions 110 associated with a vendor 120 or vendors 120 associated with a region, the vendor management module 330 may account for products or services provided by various vendors 120 so similar products or services are provided to users in a region 110 before and after modification of the vendors 120 associated with the region 110.

In various embodiments, the vendor management module 330 determines vendors 120 to which orders received from users are communicated based on times for various vendors 120 to fulfill received orders. The vendor management module 330 may account for various criteria when determining a vendor 120 to receive an order from a user received by the vendor management module 330. For example, the vendor management module 330 obtains locations for multiple vendors 120 in the venue 100 and times for each of vendors 120 to fulfill received orders, as further described below in conjunction with FIG. 4, along with products or services provided by each of the vendors 120. When the vendor management module 330 receives an order from a user, the vendor management module 330 identifies multiple vendors 120 providing a product or a service included in the order and retrieves locations for each of the identified vendors 120 and times for each of the vendors 120 to fulfill received orders. Based on the locations in the venue 100 of each of the identified vendors 120 and the times for each of the identified vendors 120 to fulfill received orders, the vendor management module 330 determines a vendor 120 and communicates the order to the determined vendor 120. For example, the vendor management module 330 communicates the order to an identified vendor 120 having a minimum time to fulfill received orders and having a location in the venue 100 less than a threshold distance to a location of at least one other identified vendor 120 in the venue 100. As another example, the vendor management module 330 communicates the order to an identified vendor 120 having a minimum time to fulfill received orders and having a distance between the location in the venue 100 of the identified vendor 120 and a location associated with the order that is within a threshold amount of a distance between the location in the venue 100 of at least one other identified venue and the location associated with the order. Determining a vendor 120 to which an order is communicated is further described below in conjunction with FIG. 4.

Various vendors 120 may use delivery personnel to deliver products or services to users who ordered the products or services from different locations within the venue 100. This allows users in the venue 100 to more conveniently obtain products or services from the vendor 120 by allowing the users to obtain the products or services 100 without physically going to the location in the venue 100 of the vendor 120. The vendor management system 250 obtains information for an amount of usage of delivery personnel by one or more vendors 120 to deliver products or services. An amount of usage of delivery personnel by a vendor 120 is an amount of time spent by delivery personnel delivering products or services from the vendor 120 to users within a specific time interval. In an embodiment, the venue management system 250 associates a different identifier with different delivery personnel and captures information identifying an amount of time individual delivery personnel spent delivering products or services from the vendor 120 to users within a time interval (e.g., an hour interval) and maintains a percentage of the time interval spent by individual delivery personnel delivering products or services from the vendor 120 and vendors 120 associated with individual deliver personnel. Based on the percentages of the time interval spent by various delivery personnel delivering products or services, the vendor management module 330 determines an average percentage of the time interval during which delivery personnel delivered products or services to users for various vendors 120. As another example, vendors 120 maintain times for different delivery personnel to deliver products or services to users who ordered the products or services and maintains an average amount of time for delivery personnel to deliver products or services to users from the maintained times and provide the maintained times to the vendor management module 330, which stores the maintained times in association with identifiers of delivery personnel and with vendors 120.

In various embodiments, the vendor management module 330 modifies associations between delivery personnel and vendors 120 based on amounts of usage of delivery personnel by various vendors 120. For example, the vendor management module 330 modifies an association of delivery personnel with a vendor 120 having less than a threshold usage of delivery personnel to an association with an additional vendor 120, such as an additional vendor 120 having greater than the threshold usage of delivery personnel or having greater than an additional threshold usage of delivery personnel. The vendor management module 330 may account for order volumes at different vendors 120 when modifying associations between delivery personnel and vendors 120 in addition to the amounts of usage of delivery personnel by various vendors 120. For example, the vendor management module 330 modifies associations of delivery personnel with vendors 120 having less than a threshold usage of delivery personnel to associations with vendors 120 having at least a threshold number of pending orders or to associations with vendors 120 having at least a threshold rate at which orders are received. The vendor management module 330 may also modify associations between delivery personnel and vendors 120 based on distances between locations in the venue 100 of various vendors 120, so delivery personnel is associated with other vendors 120 having locations in the venue 100 less than a threshold distance from locations in the venue 100 associated with vendors 120 with which the delivery personnel was originally associated.

Additionally, the vendor management module 330 receives information from a vendor system 240 and communicates the information to one or more client devices 210 for presentation to users. For example, the vendor system 240 communicates a time to fulfill an order, an estimated time to fulfill an order, a number of previously received orders that have yet to be fulfilled, or other suitable information to the vendor management module 330, which provides at least a subset of the information to a client device 210 for presentation to a user. As another example, a vendor system 240 communicates a message to the vendor management module 330 including a user identifier, an order identifier (or a description of an order), and an indication that an order corresponding to the order identifier has been fulfilled by a vendor. The vendor management module 330 identifies a user corresponding to the user identifier from the user profile store 305 and communicates the message to a client device 210 associated with the user.

As vendors 120 may deliver products to users in various regions 110 of the venue 100 to fulfill orders received from various users, in some embodiments, the vendor management module 330 regulates communication of orders received from client devices 210 associated with users to vendor systems 240 associated with various vendors 120. When the vendor management module 330 receives an order for a product or a service from a client device 210 associated with a user, the vendor management module 330 stores the received order in a queue for a specified time interval before communicating the order to a vendor system 240 corresponding to a vendor 120 identified by the order. If the vendor management module 330 receives additional orders from users having one or more characteristics matching or similar to the order stored in the queue and identifying the vendor 120 identified by the order while the order is stored in the queue, the vendor management module 330 generates a group including the additional orders and the order stored in the queue and communicates the group or orders to a vendor system 240 associated with the vendor 120 to be fulfilled. For example, the vendor management module 330 generates a group including additional orders associated with users having a location matching a location of a user associated with an order stored in the queue. As additional examples, the vendor management module 330 generates a group including orders identifying products or services matching, or similar to, a product or service specified by an order stored in the queue or generates a group including orders identifying products or services having times for fulfillment within a threshold value of a time for fulfillment of the order stored in the queue. Communicating a group of orders having one or more matching or similar characteristics to a vendor system 240 allows the vendor 120 associated with vendor system 240 to more efficiently fulfill orders from users.

The content selection module 335 selects one or more content items for communication to a client device 210 for presentation to a user. Content items eligible for presentation to the user are retrieved from the content store 310, from a third party system 230, or from another source, by the content selection module 335, which selects one or more of the content items for presentation to the user. A content item eligible for presentation to the viewing user is a content item associated with at least a threshold number of targeting criteria satisfied by characteristics of the user or is a content item that is not associated with targeting criteria. For example, a content item associated with targeting criteria specifying a threshold distance of the venue 100 is identified as eligible for presentation to users associated with locations within a threshold distance of the venue 100. As another example, a content item associated with targeting criteria specifying attendance of an event at the venue 100 is identified as eligible for presentation to users attending the event or who have indicated they will attend the event. In various embodiments, the content selection module 335 includes content items eligible for presentation to the user in one or more selection processes, which identify a set of content items for presentation to the user. For example, the content selection module 335 determines a measure of relevance of various content items to a user based on characteristics associated with the user by the venue management system 250 based on actions associated with the user by the venue management system 250, characteristics of the user maintained by the venue management system 250, preferences of the user maintained by the venue management system 250, and characteristics of content items eligible for presentation to the user. For example, the content selection module 335 determines measures of relevance to a user based on characteristics of the content items, characteristics of the user, and actions associated with the user. Based on the measures of relevance, the content selection module 335 selects one or more content items for presentation to the user (e.g., content items having at least a threshold measure of relevance, content items having highest measures of relevance relative to other content items). In some embodiments, the content selection module 335 ranks content items based on their associated measures of relevance and selects content items having the highest positions in the ranking or having at least a threshold position in the ranking for presentation to the user.

A content item may be associated with bid amounts specifying an amount of compensation received by the venue management system 250 from a third party system 130 or from a user if one or more criteria associated with the content item are satisfied. For example, a bid amount associated with a content item specifies an amount of compensation received by the venue management system 250 when the content item is presented to a user or when a user presented with the content item performs a specified type of interaction with the content item. The content selection module 335 uses the bid amounts associated with various content items when selecting content for presentation to the user. In various embodiments, the content selection module 335 determines an expected value associated with various content items based on their bid amounts and selects content items associated with a maximum expected value or associated with at least a threshold expected value for presentation to the user. An expected value associated with a content item represents an expected amount of compensation to the venue management system 250 for presenting a content item. For example, the expected value associated with a content item is a product of the content item's bid amount and a likelihood of the user interacting with the content item. The content selection module 335 may rank content items associated with bid amounts separately than content items that are not associated with bid amounts and select content items for presentation based on the separate rankings (e.g., content items having at least a threshold position in a ranking).

The web server 340 links venue management system 250 via the network 220 to one or more client devices 210, as well as to one or more third party systems 230. Additionally, the web server 340 may exchange information between the venue management system 250 and one or more vendor systems 240. The web server 340 serves web pages, as well as other content, such as JAVA®, FLASH®, XML and so forth. The web server 340 may receive and route messages between the venue management system 250 and a client device 210, for example, instant messages, queued messages (e.g., email), text messages, short message service (SMS) messages, or messages sent using any other suitable messaging technique. A user may send a request to the web server 340 to upload information (e.g., images or videos) that are stored in the content store 210. Additionally, the web server 340 may provide application programming interface (API) functionality to send data directly to native client device operating systems, such as IOS®, ANDROID™, or BlackberryOS.

Communicating Orders to Vendors within a Venue Based on Order Fulfillment

Figure 4:
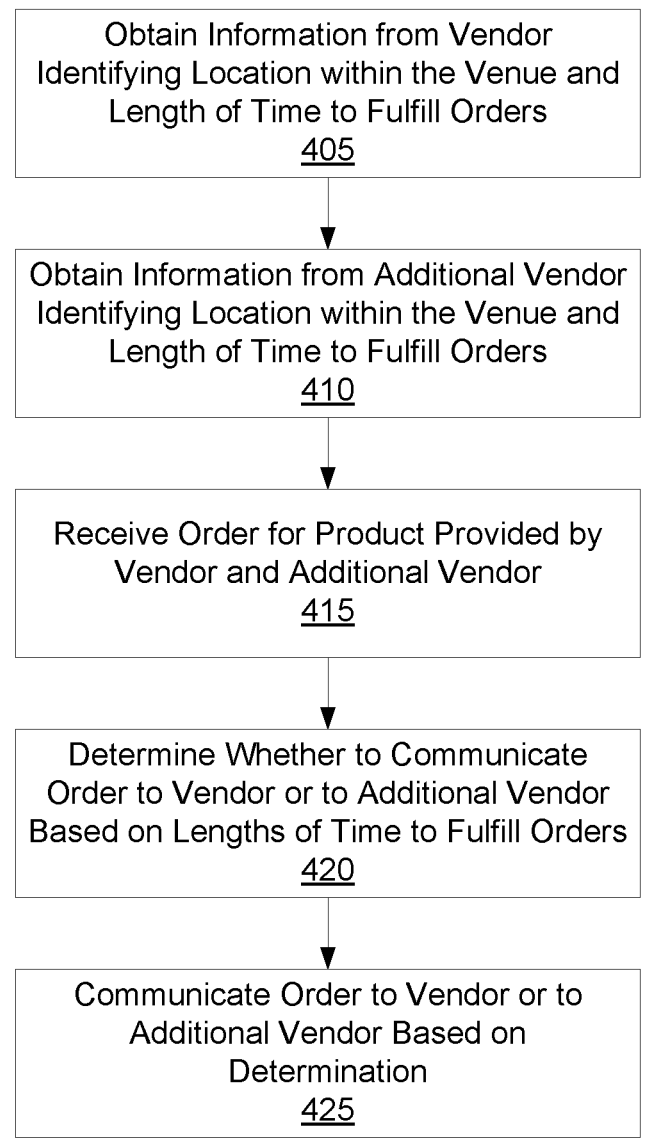
FIG. 4 is a flowchart of a method for determining a vendor to which an order is communicated based on order fulfillment by users vendors within a venue, in accordance with an embodiment.

FIG. 4 is a flowchart of one embodiment of a method for determining a vendor 120 to which an order is communicated based on order fulfillment by users vendors within a venue 100. In other embodiments, the method may include different and/or additional steps than those described in conjunction with FIG. 4. Additionally, in other embodiments, steps of the method may be performed in orders different than the order described in conjunction with FIG. 4.

The venue management system 250 obtains 405 information from a vendor 120 associated with a venue 100 that identifies a location within the venue 100 of the vendor 120 and describes a length of time for the vendor 120 to fulfill received orders. The location of the vendor 120 within the venue 100 may identify a region 110 of the venue or may include a physical location. In some embodiments, the location of the vendor 120 within the venue 100 is included in a vendor profile of a vendor 120 maintained by the venue management system 250 and including identifiers of one or more regions 110 associated with the vendor 120. The location of the vendor 120 within the venue 100 may identify portions of a region 110, such as a number of rows within the region 110, in various embodiments. Various criteria may be used to identify the location within the venue 100 of the vendor 120. For example, a location of the vendor 120 within the venue is identified as one or more regions 110 based on a distance between a location associated with the vendor 120 and the regions 110 (e.g., the location of the vendor 120 is identified as regions 110 within a threshold distance of a physical location of the vendor 120).

In some embodiments, the information describing the length of time for the vendor 120 to fulfill received orders is an average time for the vendor 120 to fulfill an order during a time interval (e.g., an average time to fulfill an order within an hour from a current time). The vendor management system 250 may receive various information from the vendor and generate the length of time for the vendor 120 to fulfill received orders from the received information in some embodiments. Alternatively, the vendor 120 generates the length of time for the vendor 120 to fulfill received orders and communicates the length of time for the vendor 120 to fulfill received orders to the venue management system 250 or the venue management system 250 retrieves the length of time for the vendor 120 to fulfill received orders from the vendor 120.

The length of time for the vendor 120 to fulfill received orders may be based on various criteria in various embodiments. As used herein, the length of time for the vendor 120 to fulfill a received order refers to a time from a user ordering a product or a service to the user receiving the ordered product or service. For example, the length of time for the vendor 120 to fulfill received orders is based on amounts of time for the vendor 120 to retrieve or to create products (or services) identified by received orders and an amount of time for the vendor to deliver products (or services) identified by received orders to users who placed the orders after retrieving or creating the products (or services). Additionally, the length of time for the vendor 120 to fulfill received orders may identify a number of pending orders with the vendor 120. In some embodiments, the venue management system 250 determines the length of time for the vendor 120 to fulfill received orders from an average amount of time for the vendor 120 to deliver products or services to users who ordered the products or services and the number of pending orders with the vendor 120; for example, the length of time for the vendor 120 to fulfill received orders is a product of the average amount of time for the vendor to deliver products or services to users who ordered the products or services and the number of pending orders with the vendor 120. Other criteria on which the length of time for the vendor 120 to fulfill received orders may be based include: an estimated time to fulfill subsequently received orders for products (or services), an estimated time to fulfill pending orders for products (or services), an average time in which previously received orders were fulfilled, a number of unfulfilled orders received by the vendor 120 within a time interval, a number or a frequency of orders received by a vendor 120 from users associated with different regions 110, and preparation times associated with various services or products provided by a vendor 120. Information describing the length of time for the vendor 120 to fulfill received orders may account for fulfillment of orders received by the vendor 120 via the venue management system 250 as well as orders received by the vendor 120 from users visiting the location associated with the vendor 120.

Various vendors 120 may use delivery personnel to deliver products or services to users who ordered the products or services from different locations within the venue 100. This allows users in the venue 100 to more conveniently obtain products or services from the vendor 120 by allowing the users to obtain the products or services 100 without physically going to the location in the venue 100 of the vendor 120. The venue management system 250 obtains information for an amount of usage of delivery personnel by one or more vendors 120 to deliver products or services. An amount of usage of delivery personnel by a vendor 120 is an amount of time spent by delivery personnel delivering products or services from the vendor 120 to users within a specific time interval. In an embodiment, the venue management system 250 associates a different identifier with different delivery personnel and captures information identifying an amount of time individual delivery personnel spent delivering products or services from the vendor 120 to users within a time interval (e.g., an hour interval) and maintains a percentage of the time interval spent by individual delivery personnel delivering products or services from the vendor 120 and vendors 120 associated with individual deliver personnel. Based on the percentages of the time interval spent by various delivery personnel delivering products or services, the venue management system 250 determines an average percentage of the time interval during which delivery personnel delivered products or services to users for various vendors 120. As another example, vendors 120 maintain times for different delivery personnel to deliver products or services to users who ordered the products or services and maintains an average amount of time for delivery personnel to deliver products or services to users from the maintained times and provide the maintained times to the venue management system 250, which stores the maintained times in association with identifiers of delivery personnel and with vendors 120.

An amount of usage of delivery personnel by the vendor 120 affects the length of time for the vendor 120 to fulfill received orders in various embodiments. For example, an amount of usage of delivery personnel less than a threshold amount decreases the length of time for the vendor 120 to fulfill received orders to indicate an increased capability of the vendor 120 to fulfill orders; conversely, an amount of usage of delivery personnel greater than the threshold amount increases the length of time for the vendor 120 to fulfill received orders to indicate a reduced capability of the vendor 120 to fulfill orders. In another example, the length of time for the vendor 120 to fulfill received orders is directly related to the amount of usage of delivery personnel by the vendor 120; for example, the length of time for the vendor 120 to fulfill received orders increases as the amount of usage by delivery personnel by the vendor 120 increases, while the length of time for the vendor 120 to fulfill received orders decreases as the amount of usage by delivery personnel by the vendor 120 decreases.

In different embodiments, the length of time for the vendor 120 to fulfill received orders is determined by a cost function based on multiple criteria, such as those described above. For example, the cost function associates different weights with different criteria and combines the weighted criteria to determine a length of time for the vendor 120 to fulfill received orders. As an example, the cost function associates weights with an amount of usage of delivery personnel by the vendor 120, an average amount of time for the vendor 120 to deliver products or services to users who ordered the products or services, and a number of orders pending by the vendor 120. In various embodiments, the venue management system 250 determines the cost function and applies the cost function to information received from the vendor 120, or the venue management system 250 provides the cost function to the vendor 120, which applies the cost function to information maintained by the vendor 120 and communicates the result of the cost function to the venue management system 250.

Similarly, the venue management system 250 obtains 410 information from an additional vendor 120 associated with the venue 100 that identifies a location within the venue 100 of the additional vendor 120 and describes a length of time for the additional vendor 120 to fulfill received orders. The location of the additional vendor 120 and the length of time for the additional vendor 120 to fulfill received orders are determined as described above. In various embodiments, the venue management 250 stores the obtained information from the vendor 120 in a vendor profile associated with the vendor 120 and stores the obtained information from the additional vendor 120 in a vendor profile associated with the additional vendor 120. Additionally, the venue management system 250 obtains 405 the location within the venue 100 of the vendor 120 and describing the length of time for the vendor 120 to fulfill received orders and obtains 410 the location within the venue 100 of the additional vendor 120 and describing the length of time for the additional vendor 120 to fulfill received orders at periodic intervals in various embodiments. Alternatively, the vendor 120 and the additional vendor 120 communicate their locations within the venue 100 and information describing lengths of time to fulfill received orders by the vendor 120 and the additional vendor 120 when the vendor 120 or the additional vendor 120 receives an order for a user or receives a threshold number of orders from users. As another example, the venue management system 250 obtains 405 the location within the venue 100 of the vendor 120 and the length of time for the vendor 120 to fulfill received orders and obtains 410 the location within the venue 100 of the additional vendor 120 and the length of time for the additional vendor 120 to fulfill received orders at particular times.

After obtaining 405 the location within the venue 100 of the vendor 120 and describing the length of time for the vendor 120 to fulfill received orders and obtaining 410 the location within the venue 100 of the additional vendor 120 and describing the length of time for the additional vendor 120 to fulfill received orders, the venue management system 250 receives 415 an order associated with a location within the venue 100 and identifying a product or a service provided by the vendor 120 and by the additional vendor 120. For example, the order identifies a location of a user within a region 110 of the venue 100 and a product or service provided by the vendor 120 and by the additional vendor 120. In a specific example, the order identifies a row and a seat within a region 110 of the user and a food item provided by the vendor 120 and by the additional vendor 120. Based on the obtained location within the venue 100 of the vendor 120 and describing the length of time for the vendor 120 to fulfill received orders and the obtained location within the venue 100 of the additional vendor 120 and the length of time for the additional vendor 120 to fulfill received orders, the venue management system 250 determines 420 whether to communicate the order to the vendor 120 or to the additional vendor 120. In various embodiments, the venue management system 250 identifies products or services provided by the vendor 120 and by the additional vendor 120.

For example, the venue management system 250 compares the length of time for the vendor 120 to fulfill received orders to the length of time for the additional vendor 120 to fulfill received orders and determines 420 whether to communicate the received order to the vendor 120 or to the additional vendor 120 based on the comparison. In an embodiment, the venue management system 250 communicates 425 the received order to the vendor 120 if the length of time for the vendor 120 to fulfill received orders is less than the length of time for the additional vendor 120 to fulfill received orders. Similarly, the venue management system 250 communicates 425 the received order to the additional vendor 120 if the length of time for the vendor 120 to fulfill received orders is greater than the length of time for the additional vendor 120 to fulfill received orders.

Additionally, the venue management system 250 accounts for the location within the venue 100 associated with the order, the location of the vendor 120 within the venue 100, and the location of the additional vendor 120 within the venue 100 when determining 420 whether to communicate the received order to the vendor 120 or to the additional vendor 120 in various embodiments. In various embodiments, the venue management system 250 determines a distance between the location within the venue 100 associated with the order and the location of the vendor 120 within the venue as well as a distance between the location within the venue 100 associated with the order and the location of the additional vendor 120 within the venue. The venue management system 250 communicates 425 the received order to the vendor 120 in response to the length of time for the vendor 120 to fulfill received orders being less than the length of time for the additional vendor 120 to fulfill received orders and in response to a difference between the location within the venue 100 associated with the vendor 120 and the location within the venue 100 associated with the order and the distance between the location within the venue 100 associated with the additional vendor 120 and the location within the venue 100 associated with the order being less than a threshold amount. Similarly, the venue management system 250 communicates 425 the received order to the additional vendor 120 in response to the length of time for the additional vendor 120 to fulfill received orders being less than the length of time for the vendor 120 to fulfill received orders and in response to the difference between the location within the venue 100 associated with the vendor 120 and the location within the venue 100 associated with the order and the distance between the location within the venue 100 associated with the additional vendor 120 and the location within the venue 100 associated with the order being less than the threshold amount. Accounting for distances between locations within the venue 100 of the vendor 120 and of the additional vendor 120 and the location within the venue 100 associated with the order when determining 420 whether to communicate the order to the vendor 120 or to the additional vendor 120 allows the venue management system 250 to prevent offsetting a decrease in the length of time for the order to be fulfilled by the vendor 120 or by the additional vendor 120 from being offset by an increased distance to traverse for the vendor 120 or the additional vendor 120 to fulfill the order.

In some embodiments, the venue management system 250 determines a distance between the location of the vendor 120 within the venue 100 and the location of the additional vendor 120 within the venue 100 and determines 420 whether to communicate the order to the vendor 120 or to the additional vendor 120 based on the distance, the length of time for the vendor 120 to fulfill received orders, and the length of time for the additional vendor 120 to fulfill received orders. For example, the venue management system 250 communicates 425 the received order to the vendor 120 in response to the length of time for the vendor 120 to fulfill received orders being less than the length of time for the additional vendor 120 to fulfill received orders and in response to the distance between the location within the venue 100 associated with the vendor 120 and the location within the venue 100 associated with the additional venue being less than a threshold distance. Similarly, the venue management system 250 communicates 425 the received order to the additional vendor 120 in response to the length of time for the additional vendor 120 to fulfill received orders being less than the length of time for the vendor 120 to fulfill received orders and in response to the distance between the location within the venue 100 associated with the vendor 120 and the location within the venue 100 associated with the additional venue 120 being less than the threshold distance.

In various embodiments, the venue management system 250 obtains locations for multiple vendors 120 in the venue 100 and times for each of vendors 120 to fulfill received orders, as further described above in conjunction with FIG. 4, along with products or services provided by each of the vendors 120. When the venue management system 250 receives an order from a user, the venue management system 250 identifies multiple vendors providing a product or a service included in the order and retrieves locations for each of the identified vendors 120 and times for each of the vendors 120 to fulfill received orders. Based on the locations in the venue 100 of each of the identified vendors 120 and the times for each of the identified vendors 120 to fulfill received orders, the venue management system 250 determines a vendor 120 to which the venue management system 250 communicates the order. For example, the venue management system 250 communicates the order to an identified vendor 120 having a minimum time to fulfill received orders and having a location in the venue 100 less than a threshold distance to a location of at least one other identified vendor 120 in the venue 100. As another example, the venue management system 250 communicates the order to an identified vendor 120 having a minimum time to fulfill received orders and having a distance between the location in the venue 100 of the identified vendor 120 and a location associated with the order that is within a threshold amount of a distance between the location in the venue 100 of at least one other identified venue and the location associated with the order. The venue management system 250 may dynamically determine a vendor 120 to which each order received by the venue management system 250 is communicated in various embodiments.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
obtaining information at a venue management system from a vendor associated with a venue identifying a location within the venue of the vendor and describing a length of time for the vendor to fulfill received orders;
obtaining information from the venue management system from an additional vendor associated with the venue identifying a location within the venue of the additional vendor and describing a length of time for the additional vendor to fulfill received orders;
receiving an order at the venue management system, the order associated with a location within the venue and identifying a product provided by the vendor and by the additional vendor;
communicating the order from the venue management system to the vendor in response to the length of time for the vendor to fulfill received orders being less than the length of time for the additional vendor to fulfill received orders and in response to the distance between the location within the venue of the vendor and the location within the venue associated with the order being within a threshold amount of the distance between the location within the venue of the additional vendor and the location within the venue associated with the order; and communicating the order from the venue management system to the additional vendor in response to the length of time for the vendor to fulfill received orders being greater than the length of time for the additional vendor to fulfill received orders and in response to the distance between the location within the venue of the vendor and the location within the venue associated with the order being within the threshold amount of the distance between the location within the venue of the additional vendor and the location within the venue associated with the order.

2. The method of claim 1, wherein the length of time for the vendor to fulfill received orders is based on an amount of time for the vendor to deliver a product to a user within the venue.

3. The method of claim 2, wherein the length of time for the additional vendor to fulfill received orders is based on an amount of time for the additional vendor to deliver the product to the user within the venue.

4. The method of claim 1, wherein the length of time for the vendor to fulfill received orders is based on an amount of usage of delivery personnel by the vendor to fulfill received orders.

5. The method of claim 4, wherein the length of time for the additional vendor to fulfill received orders is based on an amount of usage of delivery personnel by the additional vendor to fulfill received orders.

6. The method of claim 1, wherein the length of time for the vendor to fulfill received orders is based on a number of pending orders associated with the vendor.

7. The method of claim 6, wherein the length of time for the additional vendor to fulfill received orders is based on a number of pending orders associated with the additional vendor.

8. A computer program product comprising a computer readable storage medium having instructions encoded thereon that, when executed by a processor, cause the processor to:

obtain information at a venue management system from a vendor associated with a venue identifying a location within the venue of the vendor and describing a length of time for the vendor to fulfill received orders;

obtain information from the venue management system from an additional vendor associated with the venue identifying a location within the venue of the additional vendor and describing a length of time for the additional vendor to fulfill received orders;

receive an order at the venue management system, the order associated with a location within the venue and identify a product provided by the vendor and by the additional vendor;

communicate the order from the venue management system to the vendor in response to the length of time for the vendor to fulfill received orders being less than the length of time for the additional vendor to fulfill received orders and in response to the distance between the location within the venue of the vendor and the location within the venue associated with the order being within a threshold amount of the distance between the location within the venue of the additional vendor and the location within the venue associated with the order; and communicate the order from the venue management system to the additional vendor in response to the length of time for the vendor to fulfill received orders being greater than the length of time for the additional vendor to fulfill received orders and in response to the distance between the location within the venue of the vendor and the location within the venue associated with the order being within the threshold amount of the distance between the location within the venue of the additional vendor and the location within the venue associated with the order.

9. The computer program product of claim 8, wherein the length of time for the vendor to fulfill received orders is based on an amount of time for the vendor to deliver a product to a user within the venue.

10. The computer program product of claim 9, wherein the length of time for the additional vendor to fulfill received orders is based on an amount of time for the additional vendor to deliver the product to the user within the venue.

11. The computer program product of claim 8, wherein the length of time for the vendor to fulfill received orders is based on an amount of usage of delivery personnel by the vendor to fulfill received orders.

12. The computer program product of claim 11, wherein the length of time for the additional vendor to fulfill received orders is based on an amount of usage of delivery personnel by the additional vendor to fulfill received orders.

13. The computer program product of claim 8, wherein the length of time for the vendor to fulfill received orders is based on a number of pending orders associated with the vendor.

14. The computer program product of claim 13, wherein the length of time for the additional vendor to fulfill received orders is based on a number of pending orders associated with the additional vendor.

* * * * *